United States Patent [19]

Kubota

[11] Patent Number: 4,595,260
[45] Date of Patent: Jun. 17, 1986

[54] LIQUID CRYSTAL PROJECTION DISPLAY WITH EVEN TEMPERATURE ELEVATION

[75] Inventor: Keiichi Kubota, Tokyo, Japan

[73] Assignee: NEC Corporation, Japan

[21] Appl. No.: 498,258

[22] Filed: May 26, 1983

[30] Foreign Application Priority Data

May 28, 1982 [JP] Japan ................................ 57-90635
Aug. 11, 1982 [JP] Japan ............................... 57-139365

[51] Int. Cl.[4] .................................................. G02F 1/3
[52] U.S. Cl. ....................................... 350/351; 353/31
[58] Field of Search ................. 350/331 R, 342, 337, 350/350 S, 351, 401, 403, 402, 408; 358/61; 353/31, 33, 34, 37

[56] References Cited

U.S. PATENT DOCUMENTS

| | | | |
|---|---|---|---|
| 3,796,999 | 3/1974 | Kahn | 350/351 |
| 4,040,047 | 8/1977 | Hareng et al. | 350/351 X |
| 4,121,153 | 10/1978 | Thornburg | 350/351 X |
| 4,345,258 | 8/1982 | Tsai et al. | 353/31 X |
| 4,390,244 | 6/1983 | Hareng et al. | 350/351 X |
| 4,391,492 | 6/1983 | Lu et al. | 350/351 |
| 4,470,669 | 9/1984 | Kubota | 350/351 |
| 4,477,151 | 10/1984 | Mash | 350/351 |

OTHER PUBLICATIONS

High Data Density 4-Color LCD System, Information Display, May 1981, pp. 1-11.
Laser-Addressed Liquid Crystal Projection Displays, Proceeding of the S.I.D., vol. 19/1 First Quarter 1978, pp. 1-7.
Projection Storage Displays Using Laser-Addressed Smectic Liquid Crystals, The Physics & Chemistry of Liquid Crystal Devices (1980), pp. 219-239.

Primary Examiner—John K. Corbin
Assistant Examiner—David Lewis

[57] ABSTRACT

A liquid crystal projection display apparatus is disclosed. The display apparatus includes a thermally addressed liquid crystal light valve including in the following order a transparent substrate, a first transparent conductive layer, a light absorbing layer, a light reflecting layer, a first liquid crystal alignment layer, a liquid crystal material, a second liquid crystal alignment layer, a second transparent conductive layer and a transparent substrate. At least one of the first and second transparent conductive layers is provided with a distributed resistance which causes heat due to the supply of current thereto to be evenly distributed.

4 Claims, 10 Drawing Figures

LIQUID CRYSTAL PROJECTION DISPLAY WITH EVEN TEMPERATURE ELEVATION

BACKGROUND OF THE INVENTION

The present invention relates to a liquid crystal display apparatus and, more particularly, to an improvement in a laser-addressed liquid crystal display apparatus.

In parallel with the improvements in the capacity and function of a computer, there is an increasing demand for a terminal which is furnished with a higher resolution display apparatus. Particularly, in the art of computer-aided image processing, newspaper editing and LSI designing, it is desired to design the display apparatus accurately and even locally rewritable.

Difficulty is experienced, however, in increasing the resolution of a cathode ray tube (CRT) beyond 2,000 lines. A display apparatus employing a storage tube is inherently low in the available brightness of a screen, incapable of local erase and, moreover, disproportionate in cost.

What is considered promising recently for the resolution of more than 2,000 lines is a display apparatus in which a liquid crystal substance is thermally addressed by a beam of coherent laser light. For details of such a display apparatus, reference may be made to the paper entitled 37 Laser-Addressed Liquid Crystal Projection Displays" in 37 Proceeding of the S.I.D.", pp. 1–7, 1978. In this prior art display apparatus, a given voltage is applied to the whole surface of a smectic liquid crystal cell to cause the liquid crystal molecules into alignment with the electric field and thereby make the substance transparent. A laser beam selectively addresses the so conditioned liquid crystal cell so that a scattering state is locally developed in the substance (where the substrate is struck by the beam) and stored accordingly. The scattered state of the cell is caused by the thermal energy of the laser beam. Also discussed in this paper is the technique of laser-addressing the liquid crystal cell while applying a relatively low voltage thereto, whereby it is possible to locally erase data (local erase mode). The display is combined with a projection system to display data in black on a white background, i.e., in the negative mode. However, this type of display is sometimes less agreeable to spectators in some applications.

For multicolor display, a plurality of liquid crystal light valves are used to display and combine images which individually correspond to different colors. In this instance, should the light valves be of the positive mode type, it would be difficult to display color data on a black background.

Meanwhile, to display white data on a black background i.e., positive mode display, an apparatus has been proposed which scans the whole surface of a smectic liquid crystal material to set up a scattering state by a laser beam and then focuses a laser beam onto the material in the local erase mode. Still, this kind of positive mode display is impractical in view of the fact that the laser beam scanning at the present stage of development requires as long a time period as several seconds for displaying one frame.

SUMMARY OF THE INVENTION

It is therefore an object of the present invention to provide a positive mode liquid crystal display apparatus which is capable of completing one frame of display within a very short period of time.

It is another object of the present invention to provide a liquid crystal display apparatus which is suitable for multicolor data display.

Still another object of the present invention is to provide a liquid crystal display apparatus which is suitable for a uniform display characteristic over an entire screen.

A liquid crystal projection apparatus of the present invention includes a thermally addressed liquid crystal light valve having a transparent substrate, a first transparent conductive layer, a light absorbing layer, a light reflecting layer, a liquid crystal alignment layer, a liquid crystal material, a liquid crystal alignment layer, a second transparent conductive layer and a transparent substrate which are sequentially stratified in this sequence. At least one of the first and second transparent conductive layers is provided with a distributed resistance which causes heat due to the supply of a current thereto to be distributed evenly. Also included in the apparatus are a monochromatic light source, a light modulator, a light defelector, a source of projection light, a projection optical system, a voltage source for applying a voltage across the first and second transparent conductive layers, and a current source for supplying a current to the conductive layer.

In accordance with the present invention, the entire layer of the liquid crystal substance is caused to have a scattering state by heat which results from the supply of a current to the conductive layer. This contributes a great deal to a decrease in the total erase time. The distributed resistance of the transparent conductive layer provides uniform temperature on the cell, thus ensuring a uniform display characteristic over an entire screen.

PREFERRED EMBODIMENT OF THE INVENTION

To better understand the present invention the prior art apparatus disclosed in the previously mentioned paper will be described first.

Figure 1:
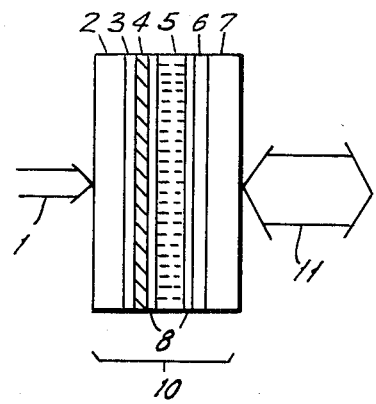
FIG. 1 is a schematic section of a prior art liquid crystal light valve.

Referring to FIG. 1, a laser beam 1 scans a liquid crystal light valve 10 to write an image thereinto. Projection light 11 is incident on and reflected by the light valve 10 to display the stored image. The light valve 10 includes a light absorbing layer 3, a light reflecting layer 4 made of aluminum and an alignment layer 8, which are sequentially deposited on a glass substrate 2. The light valve 10 also includes a transparent electrode layer 6, and a second alignment layer 8, which are sequentially deposited on a second glass substrate 7. A liquid crystal material 5 is sandwiched between the glass substrates 2 and 7. The laser beam 1 coming in through the glass substrate 2 is absorbed by the absorbing layer 3 to be thereby converted into heat. The heat propagates through the aluminum layer 4 and alignment layer 8 to elevate the temperature of the liquid crystal material 5. The liquid crystal material 5, comprising a smectic liquid crystal, changes its state or phase into the nematic and isotropic liquid in response to the temperature elevation and is rapidly cooled when the laser beam 1 is removed. When cooled, the liquid crystal molecules will retain the resulting randomly scattering alignment to form scattering centers. The projection light 11 reads out the stored scattering centers and displays them on a screen in the form of pixels. Because scattering centers are capable of forming spots each being as small as about 10 microns in diameter, even 5000×5000 spots may be written into a liquid crystal light valve which is two inch square. To erase the data, an electric field is applied between the aluminum layer 4 and the electrode layer 6 so that the liquid crystal molecules may be reoriented into the transparent state.

A thermally addressed liquid crystal light valve utilizes the phase transition of a liquid crystal substance due to temperature variations and, therefore, it is a primary requisite to maintain the bias temperature at a constant level. A typical implement for maintaining the cell temperature constant may be temperature-controlled oven which envelopes the entire cell.

Figure 2:
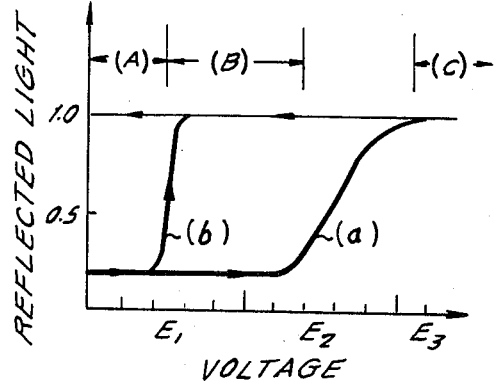
FIG. 2 is a graph for explaining data writing and erasing operations which are based on the electrothermooptic effect of a smectic liquid crystal.

FIG. 2 shows curves which illustrate the relationship between a voltage applied across the aluminum reflection layer 4 and the electrode layer 6 of the laser-addressed light valve 10 and the reflected amount of projection light 11 transmitted through the liquid crystal 5. Curve (a) shows the characteristic in the absence of the addressing light 1 and curve (b) shows the characteristic in the presence of the addressing light. It will be seen from the curve (a) that the liquid crystal 5 begins to become aligned to the electric field, and thereby transparent throughout its surface upon the rise of the voltage beyond a level $E_2$, reaching the full transparent state as the voltage rises beyond a level $E_3$. This full transparent state does not vary even though the voltage may be lowered thereafter. The curve (b), on the other hand, shows that the liquid crystal 5 becomes transparent at a voltage $E_1$, lower than the voltage $E_2$, and maintains the transparency even if the voltage is lowered thereafter.

Thus, the scattering centers formed by the laser-addressing of the light valve will behave in any one of the three different modes: (1) a storage mode wherein the scattering centers remain despite a drop of the voltage beyond $E_1$ to retain stored data (range (A) in FIG. 2), (2) a selective erase mode wherein in response to a newly applied voltage between $E_1$ and $E_2$ and a laser beam, the scattering centers in the illuminated region disappear and become transparent (range (B)), and (3) a total erase mode wherein all the scattering centers become transparent whether or not addressed by the laser beam, in response to a voltage higher than $E_3$ (range (C)). In this type of prior art display, the entire surface of the liquid crystal material 5 is made transparent in the total erase mode and then addressed by the laser beam 1 to form scattering centers in the illuminated area, followed by projection of light onto the screen through projection optics to focus the light reflected from the aluminum layer 4. The result is an image appearing in black on a white background.

Figure 3:
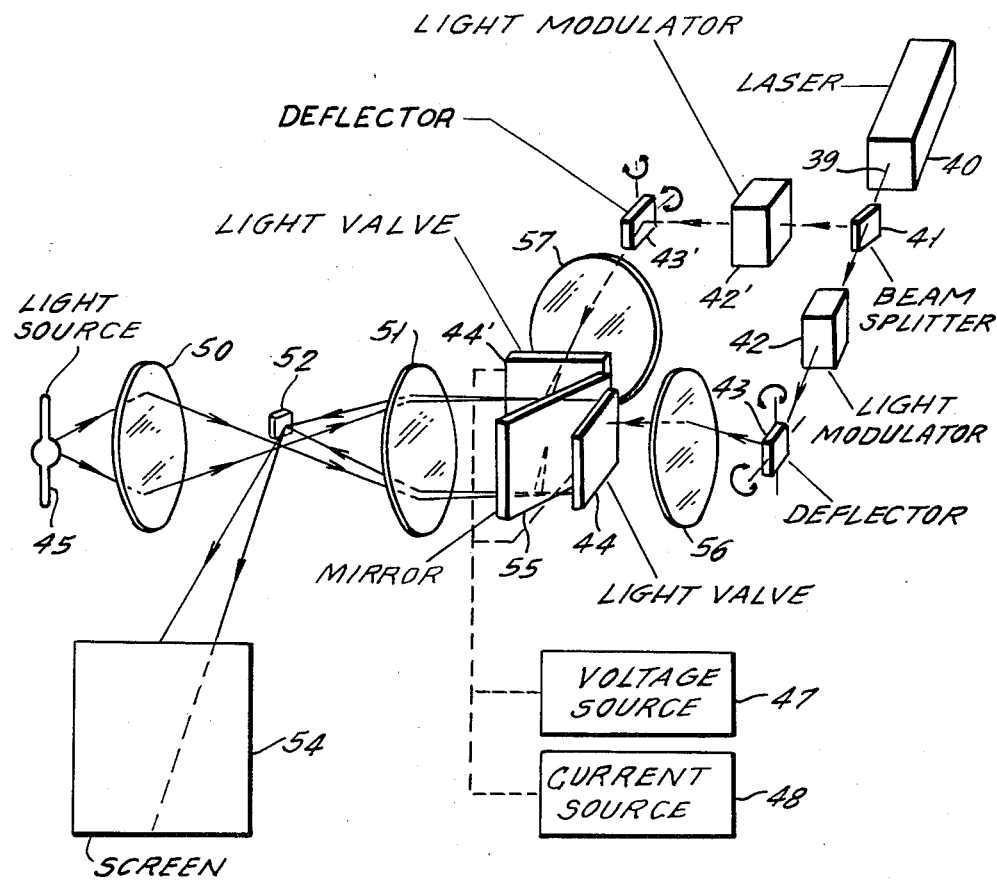
FIG. 3 is a view of a display apparatus embodying the present invention.

Referring now to FIG. 3, a liquid crystal projection display apparatus in accordance with a preferred embodiment of the present invention is shown. The apparatus includes a projection system made up of a source of projection light 45, illustratively a xenon (Xe) lamp, lenses 50 and 51, and a small mirror 52 located between the lenses 50 and 51. The projection system is adapted to project light from the source 45 onto a screen 54. The light emitted from the source 45 is converged by the lens 50, transformed into parallel beams by the lens 51, and then incident on a dichroic mirror 55 which is inclined 45 degrees to the aligned optical axes of the lenses 50 and 51. A liquid crystal light valve 44 is located at the rear of the dichroic mirror 5. A second liquid crystal light valve 44' is positioned such that the parallel beams reflected by the dichroic mirror 55 become incident thereon. The structure and property of these light valves will be discussed in detail later.

Each of the light valves 44 and 44' is scanned by a laser beam which is converged by a lens 56 or 57 respectively, as will be described. A laser beam 39 is emitted from an argon (Ar) laser 40 and split by a beam-splitting mirror 41. One of the split beams is modulated by a light modulator 42 and then deflected by a two-dimensional deflector 43 to scan the light valve 44. The other beam is processed by a light modulator 42' and then by a deflector 43' to scan the light valve 44' in the same way as the beam incident on the light valve 44. The associated modulator and deflector are operably timed to each other as well known to persons well practiced in the art. A voltage source 47 applies a voltage across opposite electrodes of each light valve which sandwitch a liquid crystal material therebetween. A current source 48 supplies a current to one of the electrodes in each light valve so as to produce heat therein, which will establish the scattering state throughout the surface of the liquid crystal. The voltage source 47 and current source 48 will be described in detail in conjunction with the light valves 44 and 44'.

The two light valves 44 and 44' are employed for multi-color data display. The respective modulator 42 or 42' will modulate specific color data assigned thereto, while the associated light valve 44 or 44' will be made transparent or scattered depending upon the modulated data.

Figure 4:
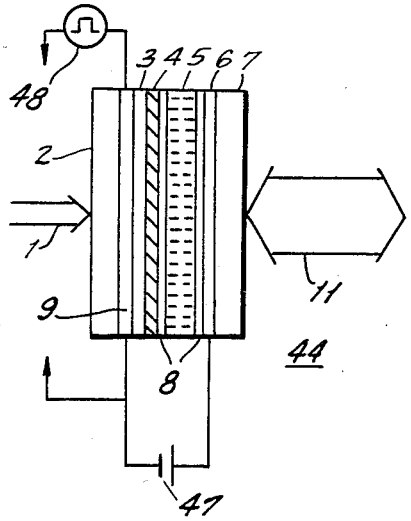
FIG. 4 is a section of a liquid crystal light valve applicable to the embodiment shown in FIG. 3.
Figure 5:
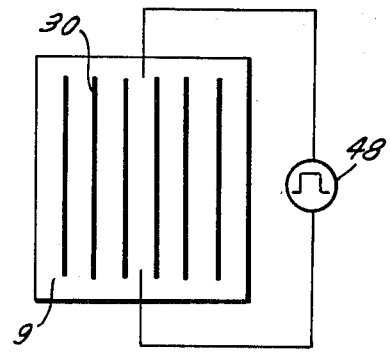
FIG. 5 is a plan view of a transparent conductive layer included in the light valve of FIG. 4.

Reference will be made to FIG. 4 for describing the construction of the light valves 44 and 44'. As shown, the light valve 44 or 44' includes a transparent substrate 2 carrying thereon a transparent conductive layer 9, a light absorbing layer 3, a reflection layer 4 and an alignment layer 8 in sequence, and a transparent substrate 7 carrying thereon a transparent conductive layer 6 and an alignment layer 8. A liquid crystal material 5 is held between the transparent substrates 2 and 7. Each conductive layer 9 or 6 is deposited on the substrate 2 or 7 by vacuum evaporation or sputtering of $In_2O_3$, $InTi_2O_3$, $Sb_2O_3$, $Ta_2O_3$, $PbF_2$ or like compound. The absorbing layer 3 is made of a compound semiconductor such as CdTe or $Mg_2Si$ or a pigment-containing organic polymer. The reflection layer 4 is deposited on the layer 3 by vacuum-evaporating aluminum to a thickness on the order of 500 angstroms. Each alignment layer 8 is formed on the aluminum layer 4 or the conductive layer 6 by alignment deposition of SiO, SiO$_2$ or the like to a thickness of about 100 angstroms. Although not shown in the drawing, spacers each dimensioned about 12 microns are held between the substrates 2 and 7 and the assembly is sealingly bonded together by a Torr seal along the periphery thereof. A smectic liquid crystal material (e.g. n-octyl cyano biphenyl), serving as the liquid crystal 5, is injected into the assembly through an aperture (not shown) formed through either one of the substrates 2 and 7, under a low pressure and application of heat. One or both of the conductive layers 9 and 6 have stripe patterns as one shown in FIG. 5 and is connected to the current source 48. Taking the conductive layer 9 for example, it is divided into stripe-shaped areas by linearly extending high resistance regions 30 so that the current density and thereby the heat produced may be distributed evenly throughout the conductive layer. While such may be more desirably implemented as the pitch to length ratio of the stripes decreases, a ratio of not more than 1/10 will suffice. The high resistance regions without the conductive layer should preferably be as narrow as possible because a voltage can not be applied to the liquid crystal thereat. The linear high resistance regions 30 may be formed by etching or laser-trimming a transparent conductive layer. For example, when a 4.2 W YAG laser beam is employed to scan a transparent conductive layer (resistance being 10 $\Omega$/cm$^2$) at a rate of several tens of microns per second, high resistance regions will be formed each to a thickness not larger than 1/10 microns and to a width of several tens of microns. The resistance of the conductive layer, 9 and 6 depends on a selected thickness during vacuum evaporation and a selected oxidation process after the vacuum evaporation. Concerning an In$_2$O$_3$/SnO$_2$ film, for example, the specific gravity is 1.4 g/cm$^3$ and the specific heat is 1.3 J/g. °C. so that, assuming the thickness is 1 micron over an area of 5 cm$^2$ and the surface resistivity is 10 $\Omega$/5 cm$^2$, the temperature will increase by about 30° C. in response to a voltage of 50 V which is applied for 10 milliseconds. Generally, a smectic liquid crystal changes its state from the smectic to the liquid when the temperature is elevated by 20° C.

Figure 6B:
FIGS. 6(a) and 6(b) are diagrams showing a current flowing through the conductive layer and a thermal response in timed relation.
Figure 6A:
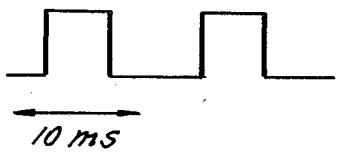

FIGS. 6(a) and 6(b) illustrate waveforms which represent an actually measured relationship between a voltage applied across the conductive layer 9 and an elevation of heat generated therein. When a pulse voltage (50 V) was applied to the layer 9 as shown in FIG. 6(a), the temperature was found to vary as shown in FIG. 6(b). In practice, the temperature builds up and falls with a certain time constant which is caused by a heat loss due to the glass substrate and the like. As shown, a pulse duration of 10 milliseconds realizes a temperature elevation of not smaller than 20° C. and confines the attenuation after the fall of each pulse to within 20 milliseconds. Therefore, a storage state can be set up throughout the layer of the liquid crystal 5 by applying a rectangular voltage across the conductive layer 9 to establish a flow of a current therein which generates heat therein to heat the liquid crystal and thereby change the whole liquid crystal from the smectic phase to the isotropic liquid phase, and then rapidly cooling the liquid crystal. At this time, the whole liquid crystal layer will be brought into the scattering state to constitute a black background. Thereafter, a laser beam is emitted to scan the light valve while applying a voltage across the electrodes 9 and 6 which establishes an electric field across the liquid crystal (range (B) in FIG. 2) whereby the layer 3 absorbs the beam to make the adjacent part of the liquid crystal material 5 transparent. As a result, an image will appear in white on the black background.

Returning to FIG. 3, details of the varying display condition will be discussed. A pulse current is fed to the conductive layer 9 of the light valve 44 from the current source 48, followed by sharp cooling which will place the whole liquid crystal surface into the scattering state. In this condition, the light from the Xe lamp 45 incident on the light valve 44 through the optics will be scattered by the liquid crystal. While in the nonscattering, transparent state the light valve will be focused onto the screen 54 via the dichroic mirror 55, lens 51 and mirror 52, in the scattering state the whole screen 54 appears as a black background because the amount of light incident on the mirror 52 is small. During the time that the supply of pulse current to the conductive layer 9 of the bulk scattering light valve is off, a laser beam is emitted to scan the light valve under the application of a relatively low voltage (several tens of volts) across the conductive layers 6 and 9 from the voltage source 47, thereby making the scanned area transparent. As a result, the Xe light incident on the light valve is reflected by the aluminum layer 4 via the liquid crystal cell and thereby focused through the lens 51 and mirror 52 onto the screen 54 to form a bright image representative of the transparent area. After the entry of necessary data, data may be newly written into the entire surface by supplying the pulse current again to the conductive layer 9 to set up the bulk or total scattering state and then laser-addressing the light valve while applying the voltage across the conductive layers 6 and 9. Although the description has concentrated on the light valve 44, it will be seen that the other light valve 44' is essentially common in operation to the light valve 44 except that the modulated data written thereinto is concerned with another color and that the display on the screen 54 corresponds to the wavelength component reflected by the dichroic mirror 55. When operated at the same time, the light valves 44 and 44' will provide a multicolor data display on the screen 54.

Now, a current source suitable for applying the pulse current to the conductive layer will be discussed in conjunction with a liquid crystal light valve and employing a conductive layer which is different in dimension from the one employed in the embodiment.

To create the scattering state in a liquid crystal light valve by heating it with a current, it is a requisite to heat the whole liquid crystal 5 into the isotropic liquid state and then rapidly cool it back into the smectic phase within a short period of time. This is accomplished by supplying a large current to the conductive layer 9 for a moment to elevate the temperature by the heat, followed by rapid cooling (which is effected by cutting off the current supply). Assuming the conductive layer 9 has a length l, a width w, a thickness d and a volume resistivity P, its resistance R is expressed as R=Pl/wd. Therefore, the input wattage E in response to a voltage V is E=VI=V$^2$wd/Pl, which produces a temperature elevation $\Delta$T of the conductive layer as:

$$\Delta T = KEt/PcPglwd \qquad (1)$$
$$= K(V/l)^2 t/P \cdot Pc \cdot Pg$$

where Pc and Pg are the specific heat and specific gravity of the conductive layer respectively, and K is the dissipation factor of the generated heat. As understood from the Eq. (1), the temperature elevation $\Delta T$ will be increased if the voltage gradient (V/l) is increased and the resistivity P decreased. Where use is made of an indium tin oxide (ITO) layer for the transparent electrode, a resistance R of about 10 Ω is attainable with a liquid crystal light valve which is 2 inch square. To make the temperature elevation $\Delta T$ in the Eq. (1) not less than 10° C., a voltage of approximately 100 V is necessary and a current not less than 10A has to be switched within a period of time as short as several tens of milliseconds.

Figure 7:
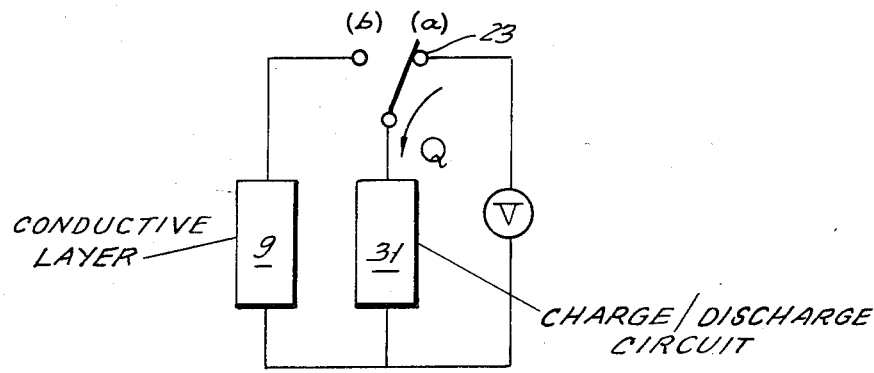
FIG. 7 is a block diagram of a current source applicable to the embodiment of the present invention.

Referring to FIG. 7, the current source 48 preferably including a charge and discharge circuit 31, which comprises a capacitor, a voltage source V and a switch 23. The switch 23 is first connected to one terminal (a) to charge the capacitor 31 and, then, to the other terminal (b) thereby transferring the charge from the capacitor 31 to the conductive layer 9 of the light valve. This procedure permits a large current to flow through the conductive layer 9 within a short period of time. Assuming the capacitor has a capacity C, the charged energy W is expressed by $W=CV^2/2$ with a voltage V applied. The time period needed to discharge this energy from the capacitor to the conductive layer 9 of the resistance R will be $\tau=CR$. A substantial period of time for which a laser beam will be emitted for writing data, i.e., about several seconds, is insured for charging the capacitor; a power source of a relatively small capacity will suffice the purpose. Because the resistance R of the conductive layer is as small as about 10 Ω, a discharging time $\tau$ on the order of several tens of milliseconds is readily attainable.

Figure 8:
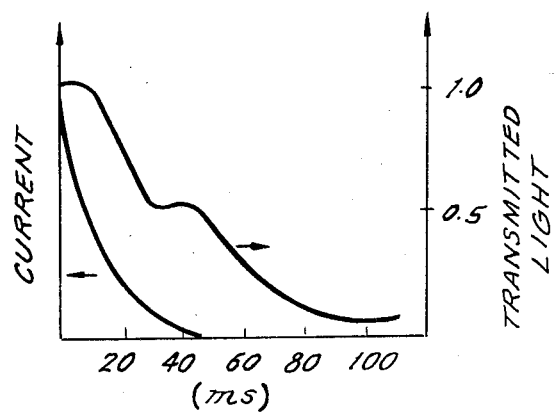
FIG. 8 is a graph representing a relationship between a current fed from a charging circuit to the conductive layer and a transmission response characteristic of a liquid crystal light valve.
Figure 9:
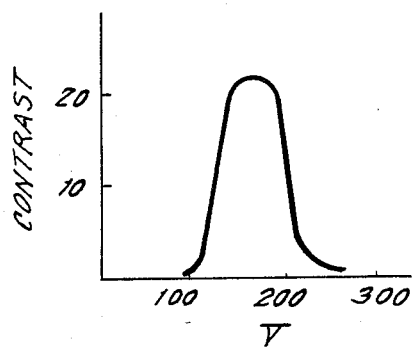
FIG. 9 is a graph showing a relationship between a charging voltage and a contrast.

FIG. 8 is a plot showing a relationship between a current fed to the conductive layer 9 of the light valve and a transmission response characteristic of the liquid crystal, which resulted from the use of a capacitor having a capacity of 700 microfarads. It was found that the current through the conductive layer 6 lowers the transmissibility of the liquid crystal material 5 due to a sharp rise and drop of the liquid crystal temperature when supplied over the duration up to 20 milliseconds, thus bringing the light valve into the bulk scattering state in about 100 milliseconds. Here, a certain optimum valve exists in the voltage to be charged into the capacitor 31. Specifically the scattering state cannot be accomplished when the discharged energy is insufficient, because it will not heat the liquid crystal to a sufficient temperature. Excessive discharged energy, also, fails to set up the scattering state because it would overheat not only the liquid crystal 5 but also the substrates 2 and 7 to thereby slow down the temperature drop of the liquid crystal 5. In this sense, there exists a certain voltage V which is capable of heating the liquid crystal 5 to the clearing temperature, allowing the liquid crystal 5 to be rapidly cooled, and thereby providing the liquid crystal 5 with the scattering state. Shown in FIG. 9 is a curve which represents a charging voltage V and the resultant contrast with respect to a light valve in which the liquid crystal 5 was 12 micronsthick. As shown, the contrast reaches the peak at the voltage of about 150 V while diminishing at voltages lower and higher than 150 V, which means that an optimum value exists in the voltage.

In summary, it will be seen that in accordance with the present invention a liquid crystal material is bodily heated by heat generated in a conductive layer and then rapidly cooled to develop a scattering state therethroughout and, thereafter, it is laser-addressed under the application of an electric field to be made transparent, so that a bright image may appear on a black background on a screen. While the conductive layer has been shown and described as being striped to have an even temperature distribution on the surface thereof, various modifications are possible for the same purpose such as providing the conductive layer with a thickness distribution which will cause the resistance to stepwisely decrease from the center toward the periphery. Such a thickness distribution is achievable by selectively reducing the thickness as by ion-mealing. Additionally, the voltage for making the liquid crystal transparent may be applied across the aluminum reflection layer 4 and the conductive layer 6, instead of the shown and described application across the transparent conductive layers 9 and 6.

What is claimed is:

1. A liquid crystal projection display apparatus, comprising:

a thermally addressed liquid crystal light valve comprising in the following order a transparent substrate, a first transparent conductive layer, a light absorbing layer, a light reflecting layer, a first liquid crystal alignment layer, a liquid crystal material, a second liquid crystal alignment layer, a second transparent conductive layer and a transparent substrate; one of said first and second transparent conductive layers being provided with a thickness distribution which will cause the resistance distribution to stepwisely decrease from the center toward the periphery of said transparent conductive layers which causes resistive bending generated due to the supply of current to said one of said conductive layers to evenly elevate the temperature of a whole area of said liquid crystal material;

a monochromatic light source;

a light modulator for modulating a monochromatic light generated by said light source;

a light deflector for deflecting said monochromatic light beam onto said light valve after it has been modulated by said light modulator;

a source of projection light;

a projection optical system for projecting said projection light onto said light valve;

a voltage source for applying a voltage across either said first transparent conductive layer or said light reflecting layer and said second transparent conductive layer; and a current source for supplying a current pulse to said one of said conductive layers prior to a writing operation to cause said layer with distributed resistance to generate resistive heating that raises the temperature of said liquid crystal material, said current pulse being sufficiently short in duration that said liquid crystal material is changed in mode to a scattering state, and, after said scattering state has been attained, a writing operation may be performed to produce a positive image on a black background by addressing a message portion of said liquid crystal material in which a positive image is desired with light from said monochromatic light source and applying a voltage from said voltage source across either said first transparent conductive layer or said light reflecting layer and said second transparent conductive layer so as to render transparent and produce a positive image in said message portion of said liquid crystal material.

2. The liquid crystal projection display apparatus of claim 1, wherein said thermally addressed liquid crystal light valve consists of said transparent substrate, said first transparent conductive layer, said light absorbing layer said light reflecting layer, said first liquid crystal alignment layer, said liquid crystal material, said second liquid crystal alignment layer, said second transparent conductive layer and said transparent substrate.

3. The liquid crystal projection display apparatus of claim 1, wherein said current source places approximately 150 volts across said conductive layer at the beginning of a current pulse lasting approximately 20 milliseconds.

4. A thermally addressed liquid crystal light valve comprising, in the following order: a transparent substrate, a first transparent conductive layer, a light absorbing layer, a light reflecting layer, a first liquid crystal alignment layer, a liquid crystal material, a second liquid crystal alignment layer, a second tranparent conductive layer and a transparent substrate; at least one of the first and second transparent conductive layers being provided with a distributed resistance which causes heat due to the supply of a current to said conductive layer with thickness distribution which will cause the resistance distribution to stepwisely decrease from the center toward the periphery of said transparent conductive layers to evenly elevate the temperature of a whole area of said liquid.

* * * * *